(12) United States Patent
Ok et al.

(10) Patent No.: US 7,853,896 B2
(45) Date of Patent: Dec. 14, 2010

(54) THREE-DIMENSIONAL MOTION GRAPHICAL USER INTERFACE AND APPARATUS AND METHOD OF PROVIDING THE SAME

(75) Inventors: Joon-ho Ok, Seoul (KR); Young-ho Rhee, Seoul (KR); Sang-hyun Park, Seoul (KR); Soo-ho Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 640 days.

(21) Appl. No.: 11/586,572

(22) Filed: Oct. 26, 2006

(65) Prior Publication Data

US 2007/0097115 A1 May 3, 2007

(30) Foreign Application Priority Data

Oct. 27, 2005 (KR) .................. 10-2005-0101962

(51) Int. Cl.
*G06F 3/00* (2006.01)
(52) U.S. Cl. .................. 715/838; 715/836; 715/775; 715/782; 715/848
(58) Field of Classification Search .................. 715/838, 715/836, 775, 782, 848
See application file for complete search history.

(56) References Cited

U.S. PATENT DOCUMENTS

| | | | | |
|---|---|---|---|---|
| 5,303,388 A | * | 4/1994 | Kreitman et al. | 715/836 |
| 5,347,628 A | * | 9/1994 | Brewer et al. | 715/775 |
| 5,678,015 A | * | 10/1997 | Goh | 715/782 |
| 5,731,814 A | * | 3/1998 | Bala | 715/848 |
| 5,745,109 A | * | 4/1998 | Nakano et al. | 715/838 |
| 6,621,509 B1 | * | 9/2003 | Eiref et al. | 715/836 |
| 6,922,815 B2 | * | 7/2005 | Rosen | 715/782 |
| 7,107,549 B2 | * | 9/2006 | Deaton et al. | 715/836 |
| 2004/0135820 A1 | | 7/2004 | Deaton et al. | |

FOREIGN PATENT DOCUMENTS

| | | |
|---|---|---|
| JP | 05-120448 A | 5/1993 |
| JP | 10-222726 A | 8/1998 |
| JP | 2001-084030 A | 3/2001 |
| JP | 2004-117579 A | 4/2004 |
| KR | 10-2000-0064931 A | 11/2000 |
| KR | 10-2001-0022847 A | 3/2001 |
| KR | 10-2004-0070523 A | 8/2004 |

* cited by examiner

*Primary Examiner*—Kieu Vu
*Assistant Examiner*—Michael Roswell
(74) *Attorney, Agent, or Firm*—Sughrue Mion, PLLC

(57) ABSTRACT

A three-dimensional motion graphical user interface and an apparatus and a method of providing the same are provided. The apparatus for providing a three-dimensional motion graphical user interface includes a creation module which creates a polyhedral object having a face on which first information to be communicated to a user is displayed; a display module which displays the created polyhedral object; and an interface module which displays second information, which corresponds to a face of the displayed polyhedral object selected by the user, on a projected surface formed separately from the displayed polyhedral object.

21 Claims, 12 Drawing Sheets

THREE-DIMENSIONAL MOTION GRAPHICAL USER INTERFACE AND APPARATUS AND METHOD OF PROVIDING THE SAME

CROSS-REFERENCE TO RELATED APPLICATION

This application claims priority from Korean Patent Application No. 10-2005-0101962 filed on Oct. 27, 2005, in the Korean Intellectual Property Office, the disclosure of which is incorporated herein by reference in its entirety.

BACKGROUND OF THE INVENTION

1. Field of the Invention

Apparatuses and methods consistent with the present invention relate to a three-dimensional motion graphical user interface (MGUI), and more particularly, to a three-dimensional motion graphical user interface capable of effectively displaying information and pleasing a user.

2. Description of the Related Art

In typical digital devices, a graphical user interface (hereinafter, referred to as "GUI") is used to both allow a user to easily use digital devices and communicate information to the user quickly and intuitively. The user can command a digital device to perform a desired operation by moving a pointer by means of a pointing device, such as a keypad, a keyboard, or a mouse, and then selecting an object indicated by the pointer.

A GUI can be classified into a two-dimensional or a three-dimensional type. The two-dimensional GUI is flat and static, while the three-dimensional GUI is multi-level and dynamic as compared with the two-dimensional GUI. Accordingly, when communicating information to a user, the three-dimensional GUI is advantageous over the two-dimensional GUI in that the three-dimensional GUI is more visual than the two-dimensional GUI and pleasing to the user. For this reason, the GUIs used in the digital devices are gradually being changed from the two-dimensional type to the three-dimensional type.

However, occasionally, a two-dimensional GUI is more effective than a three-dimensional GUI. For example, in the case of text, a larger amount of information can be communicated in a two-dimensional plane, and it is easier for the user to read information using the two-dimensional GUI.

However, in the conventional three-dimensional user interface (UI), three-dimensional information and two-dimensional information cannot be displayed such that the three-dimensional information and the two-dimensional information can be dynamically associated with each other. For this reason, even though several techniques (for example, refer to an "operation procedure guiding device" disclosed in JP-A-1998-222726) have been proposed, the above problem has not yet been solved. Accordingly, it is necessary to provide a UI capable of effectively displaying information by associating the three-dimensional information and the two-dimensional information with each other.

SUMMARY OF THE INVENTION

An aspect of the present invention is to provide a three-dimensional motion graphical user interface capable of effectively displaying information and pleasing to a user and an apparatus and a method of providing the same.

Further, aspects of the present invention are not limited to those mentioned above, and other aspects of the present invention will be apparently understood by those skilled in the art through the following description.

According to an aspect of the present invention, an apparatus for providing a three-dimensional motion graphical user interface includes a creation module which creates a polyhedral object having a face on which first information to be communicated to a user is displayed; a display module which displays the created polyhedral object; and an interface module which displays second information, which corresponds to a face of the displayed polyhedral object selected by the user, on a projected surface formed separately from the displayed polyhedral object.

Further, according to another aspect of the present invention, a method of providing a three-dimensional motion graphical user interface includes creating a polyhedral object having a face on which first information to be communicated to a user is displayed; displaying the created polyhedral object; and displaying second information, which corresponds to a face of the displayed polyhedral object selected by the user, on a projected surface formed separately from the displayed polyhedral object.

Furthermore, according to still another aspect of the present invention, a three-dimensional motion graphical user interface includes a polyhedral object having a face on which first information to be communicated to a user is displayed; and a projected surface formed separately from the displayed polyhedral object so as to display second information corresponding to a face of the displayed polyhedral object selected by the user.

BRIEF DESCRIPTION OF THE DRAWINGS

The above and other features of the present invention will become more apparent by describing in detail exemplary embodiments thereof with reference to the attached drawings, in which.

DESCRIPTION OF THE EXEMPLARY EMBODIMENTS

Figure 1:
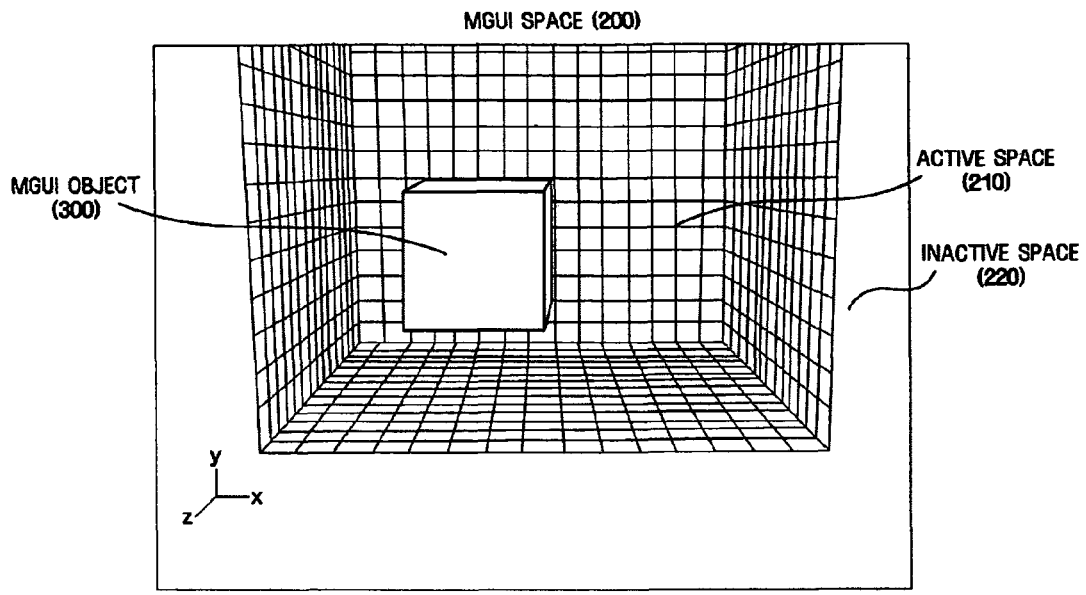
FIG. 1 is a view illustrating the entire configuration of a three-dimensional motion graphical user interface according to an exemplary embodiment of the present invention.

Aspects and features of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

The present invention is described hereinafter with reference to flowchart illustrations of three-dimensional motion graphical user interfaces and apparatuses and methods of providing the same according to the exemplary embodiments of the invention. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable data processing apparatus to produce a computer implemented process such that the instructions that execute on the computer or other programmable data processing apparatus provide steps for implementing the functions specified in the flowchart block or blocks.

In addition, each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

FIG. 1 is an exemplary view illustrating the entire configuration of a three-dimensional motion graphical user interface (hereinafter, referred to as "MGUI") according to an exemplary embodiment of the present invention.

Figure 2:
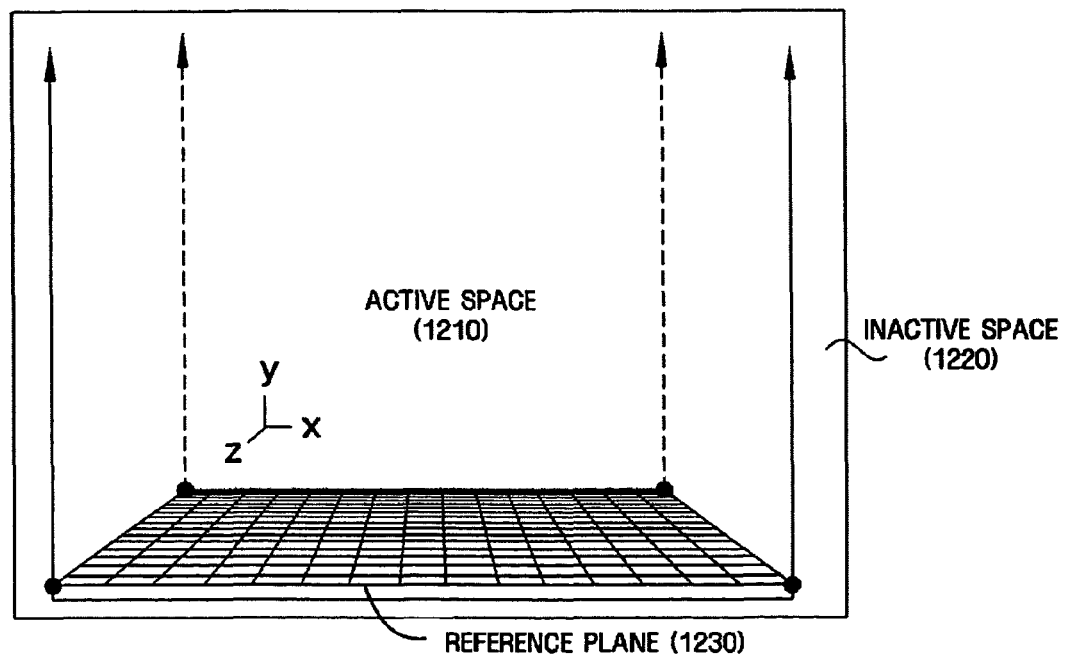
FIG. 2 is a view illustrating of a change of a three-dimensional space due to the space being divided into an active space and an inactive space according to an exemplary embodiment of the present invention.

The three-dimensional MGUI according to an exemplary embodiment of the present invention is a user interface (UI) capable of establishing a dynamic GUI environment on the basis of a three-dimensional environment and motion graphics. The MGUI environment mainly includes the following:

1. MGUI space
2. MGUI object
3. MGUI camera view
4. MGUI object presentation method First, an MGUI space 200 is a space for establishing the three-dimensional environment and is divided into an active space 210 and an inactive space 220 according to the characteristic of a space. The active space 210 can be used when a UI is designed. The MGUI space 200 may be provided in various forms according to a method of dividing the active space 210 and the inactive space 220. FIG. 2 illustrates an MGUI space including an active space 1210 and an inactive space 1220. Here, the active space 1210 is limited to a region defined by a reference plane in the X-axis and Z-axis directions but unlimited above a reference plane in the Y-axis direction.

An MGUI object 300 includes a configuration object of the MGUI that provides information to a user while interacting with the user in the three-dimensional environment. The MGUI object 300 can exist within the active space of the three-dimensional space. For example, in the case in which the MGUI space is divided into the active space 1210 and the inactive space 1220 shown in FIG. 2, the object can be located only within a space of a pillar formed by arrows, i.e., an inner space, but cannot be located outside of the space of the pillar formed by the arrows, i.e., an outer space, or a space below the reference plane. The MGUI object 300 will be described in detail later with reference to FIGS. 5A and 5B and 6A to 6E.

Figure 3:
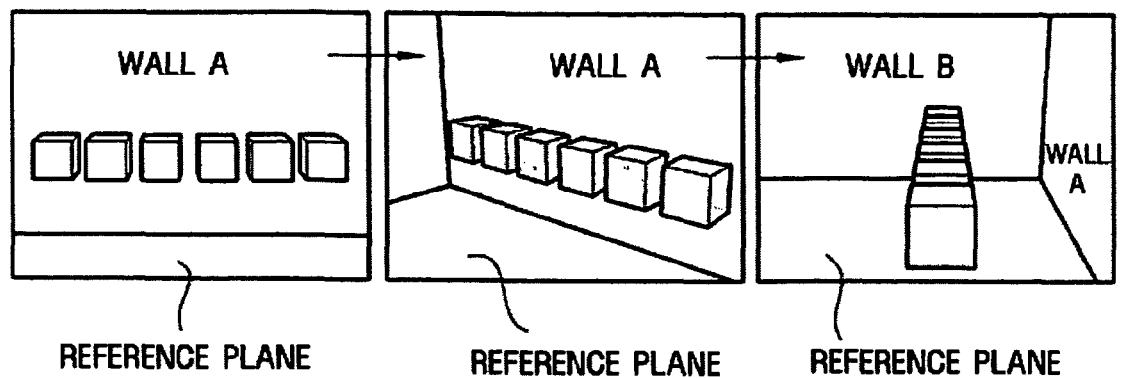
FIG. 3 is a view illustrating that motion of an object is generated in response to the movement of a camera view according to an exemplary embodiment of the present invention.

The MGUI camera view includes a viewing point in the MGUI space 200. The camera view can move within the three-dimensional space. The movement of the camera view includes navigation in the MGUI space 200, which generates motion in the entire MGUI space 200. The MGUI camera view is a main cause of motion in the MGUI environment, together with inherent motion attributes of the MGUI object 300. FIG. 3 illustrates that all objects within the three-dimensional space rotate clockwise as the camera view rotates counterclockwise.

Figure 4A:
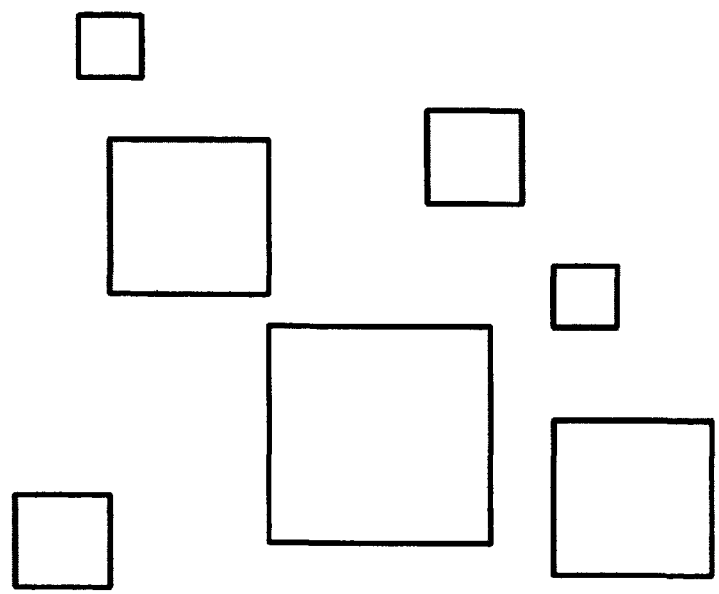
FIG. 4A is a view illustrating an example of a method of disposing a plurality of objects.
Figure 4B:
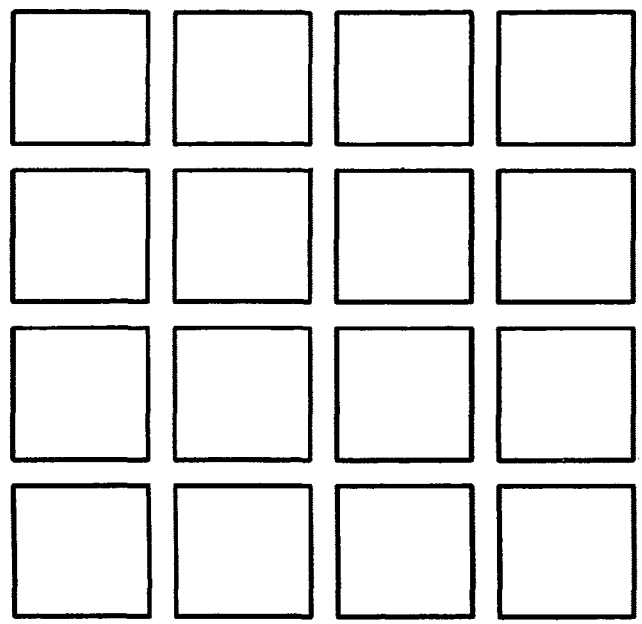
FIG. 4B is a view illustrating an example of a method of disposing a plurality of objects.
Figure 4C:
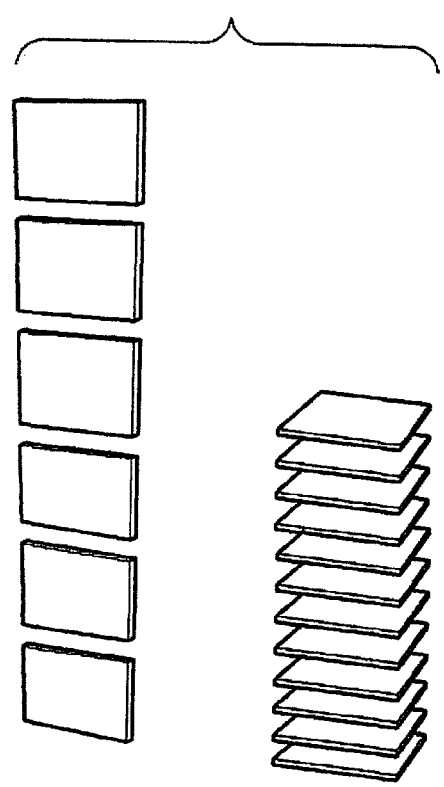
FIG. 4C is a view illustrating an example of a method of disposing a plurality of objects.
Figure 4D:
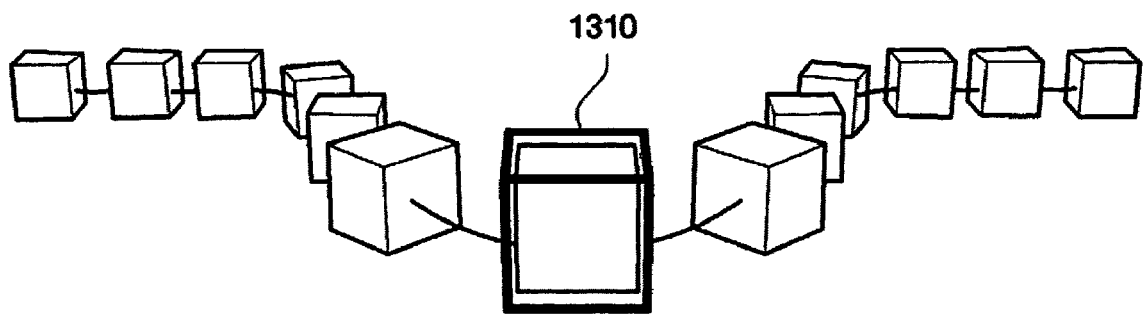
FIG. 4D is a view illustrating an example of a method of disposing a plurality of objects.

The object presentation method is a method of setting how one or more objects, which are grouped, are to be arranged in a screen. For example, as shown in FIG. 4A, objects included in the same group may be disposed to be close to a user or far from the user in the Z-axis direction, or as shown in FIGS. 4B and 4C, the objects included in the same group may be disposed in a matrix or in a straight line. Alternatively, as shown in FIG. 4D, a plurality of objects may be connected to one another in the form of a curve. Referring to FIG. 4D, the objects may be selected by moving a highlighted mark 1310, or horizontally or vertically moving the objects with the highlighted mark 1310 fixed.

Figure 5A:
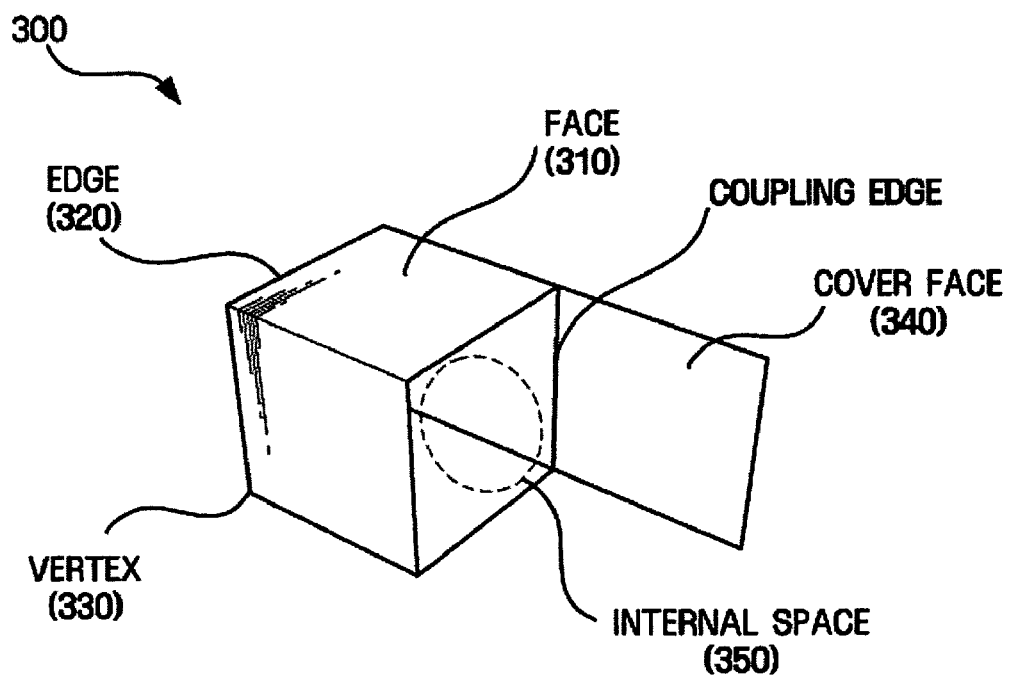
FIG. 5A is a view illustrating an example of a projected polyhedron object that is a component of a motion graphical user interface.

FIG. 5A is an exemplary view illustrating a projected polyhedron object which is a component of the three-dimensional MGUI.

The projected polyhedron object shown in FIG. 5A includes a plurality of faces 310, edges 320, and vertexes 330. Further, the projected polyhedron object includes at least one cover face 340, which can be opened and closed, and an internal space 350 surrounded by the plurality of faces 310.

The faces 310 of the projected polyhedron object can serve as information faces. Here, the information face is a face on which information to be communicated to a user can be displayed, and information on menu items or submenu thereof that can be controlled can be communicated to the user through the information face. Texts, images, moving pictures, and two-dimensional widgets that are two-dimensional visual information can be displayed on the information face. Further, three-dimensional information, such as three-dimensional icons, can also be displayed on the information face.

Figure 5B:
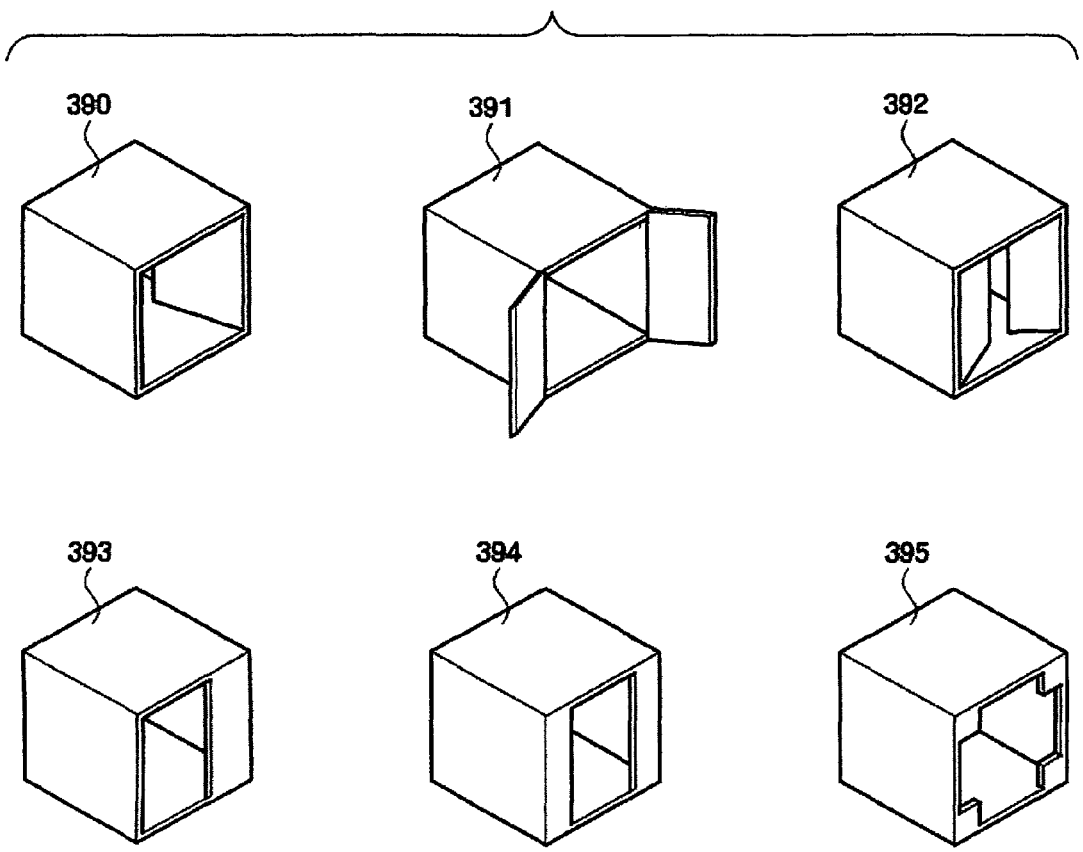
FIG. 5B is a view illustrating examples of a method of opening and closing a projected polyhedron object with a face that is opened and closed like a door.

In this case, all of the faces 310 of the projected polyhedron object can have attributes of a face that can be opened and closed. As an example, the cover face 340 can be opened like a door with a predetermined boundary surface as a reference surface, as shown in FIG. 5A. At this time, the cover face 340 that can be opened and closed like the door can be opened and closed in various methods. In FIG. 5B, various examples of the cover face 340 that is opened and closed like the door are shown. That is, the cover face 340 that is opened and closed like the door can be opened such that the cover face 340 is toward the inside of the polyhedral object (see 390 in FIG. 5B), or the cover face 340 may be separated into two or more faces so that the cover face 340 can be opened inward or outward (see 391 and 392 in FIG. 5B). Alternatively, the cover face 340 may be opened in a sliding method (see 393 in FIG. 5B). At this time, the cover face 340 may be separated into two or more faces so as to be opened in the sliding method (see 394 and 395 in FIG. 5B). In addition, the cover face 340 may be completely separated from the projected polyhedron object.

Figure 6A:
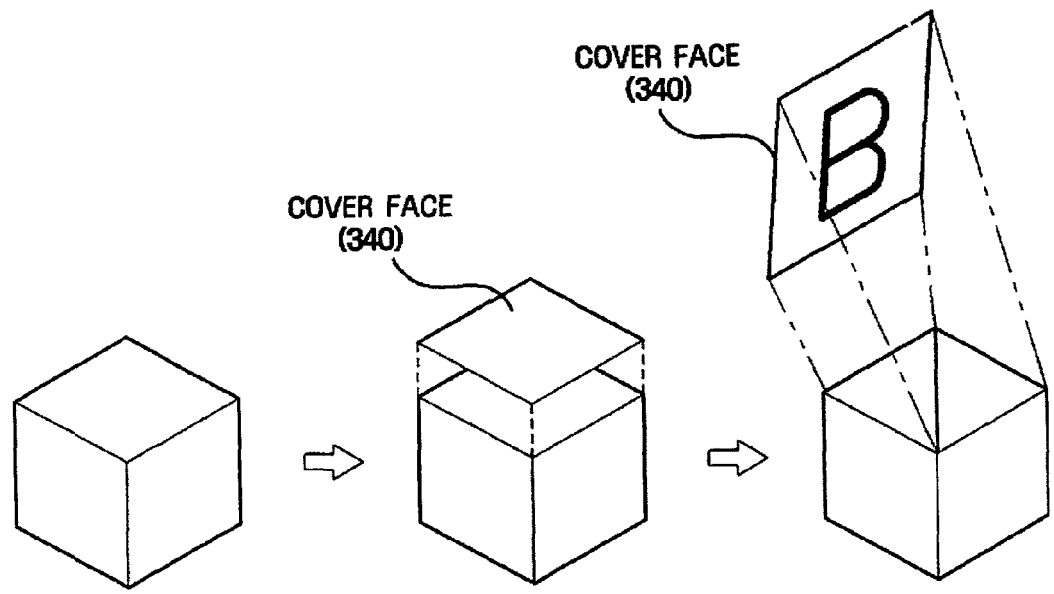
FIG. 6A is a view illustrating an example of a method of displaying information, which exists on an information face of a projected polyhedron object, on a projected surface.
Figure 6B:
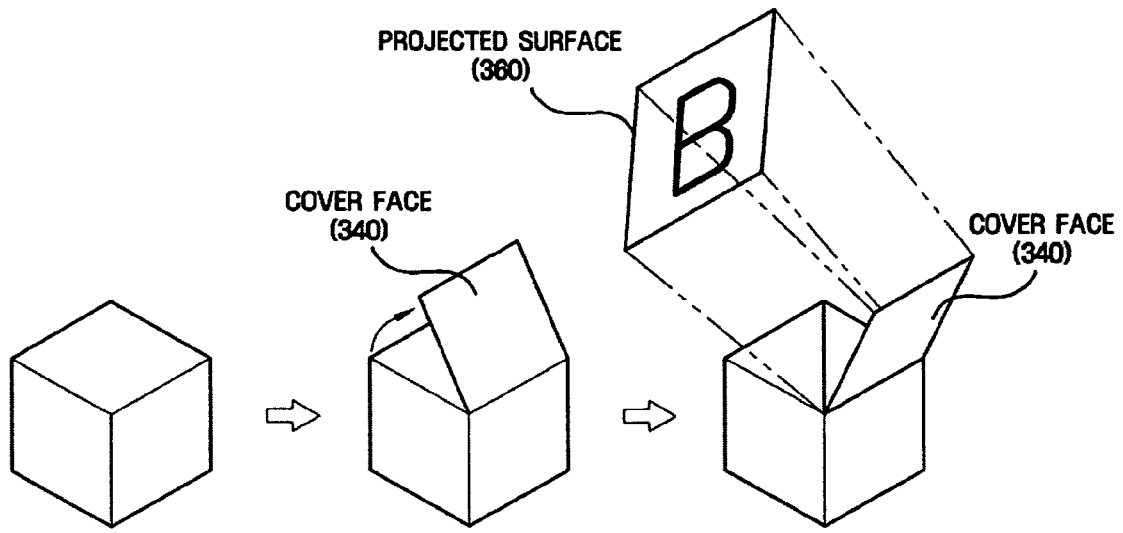
FIG. 6B is a view illustrating an example of a method of displaying information, which exists on an information face of a projected polyhedron object, on a projected surface.
Figure 6C:
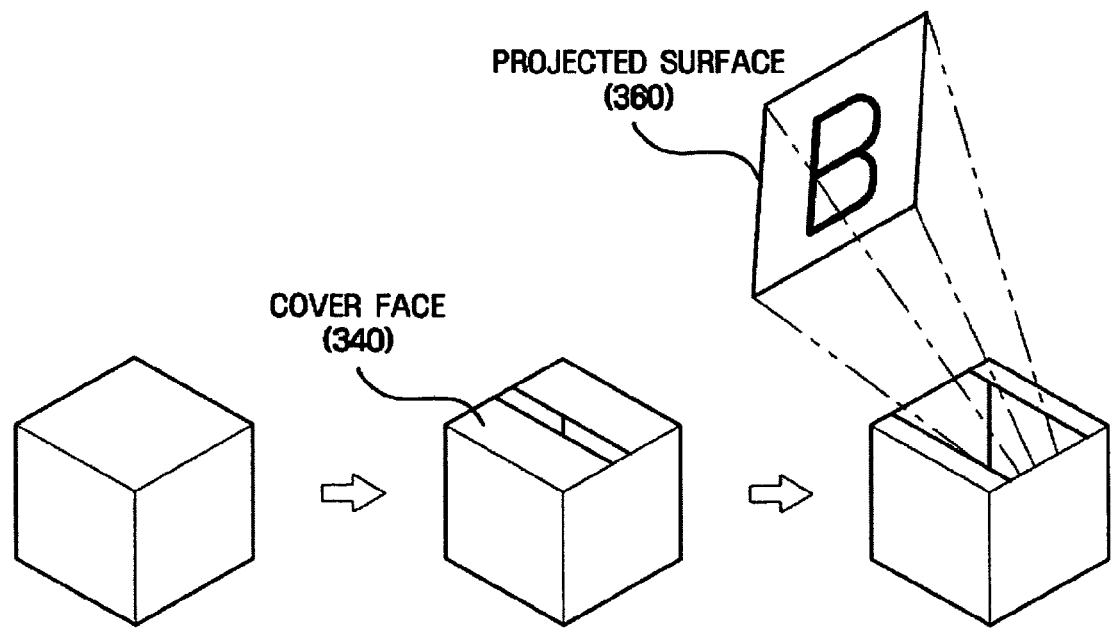
FIG. 6C is a view illustrating an example of a method of displaying information, which exists on an information face of a projected polyhedron object, on a projected surface.
Figure 6D:
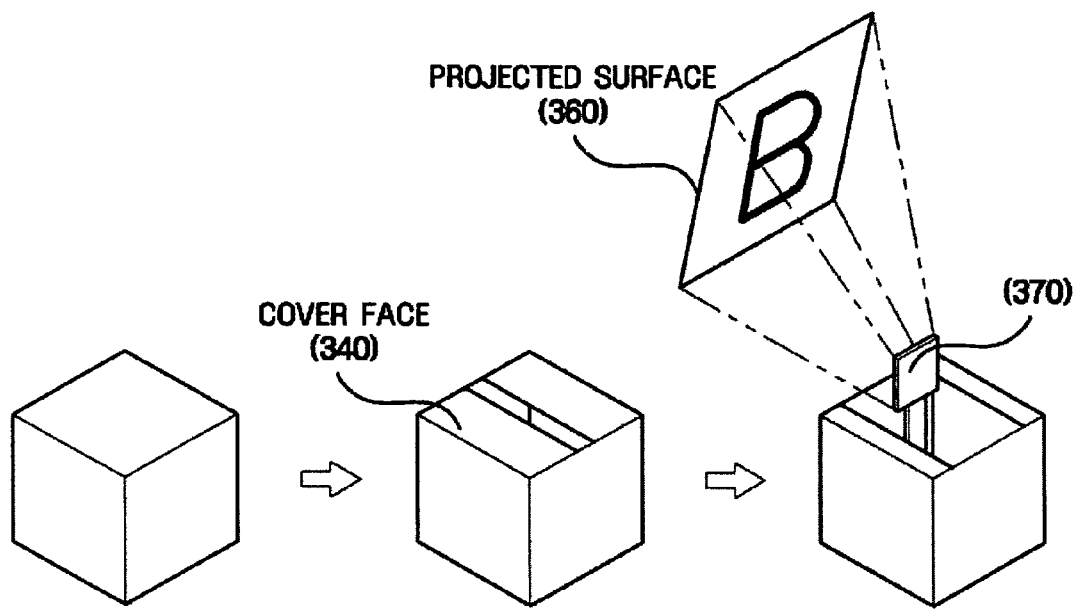
FIG. 6D is a view illustrating an example of a method of displaying information, which exists on an information face of a projected polyhedron object, on a projected surface.
Figure 6E:
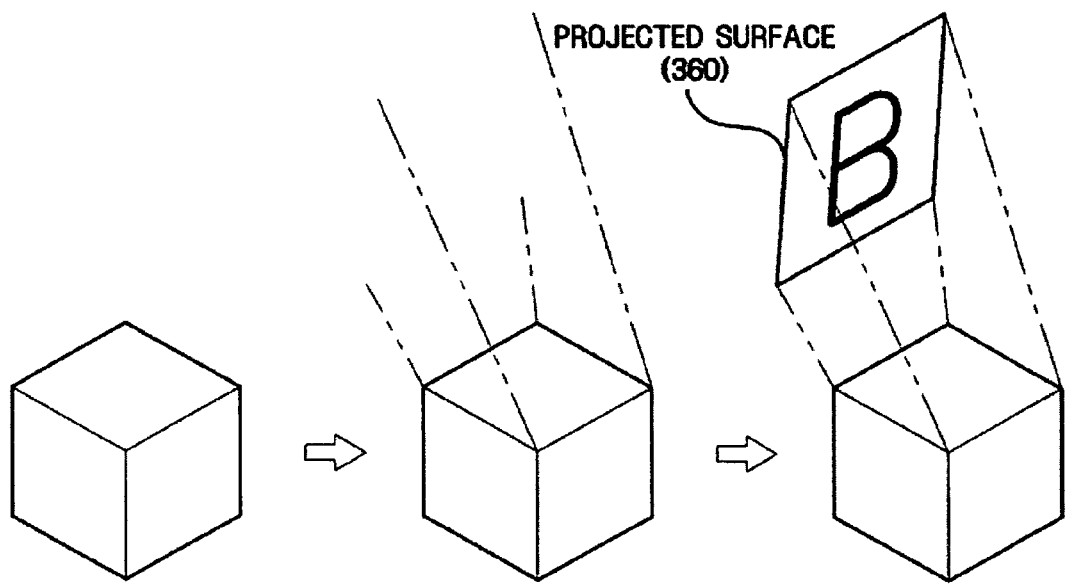
FIG. 6E is a view illustrating an example of a method of displaying information, which exists on an information face of a projected polyhedron object, on a projected surface.

When the cover face 340 is opened by a user, the projected polyhedron object displays information, which exists on an information face, on a projected surface 360 that is formed separately from the projected polyhedron object. At this time, the information on the information face can be displayed on the projected surface 360 in various ways. FIGS. 6A to 6D illustrate various examples of a method in which information on an information face is displayed. That is, in order to display information on the projected surface 360, the cover face 340 may be separated from the projected polyhedron object and then the information may be projected from an open face of the projected polyhedron object so as to be displayed on the projected surface 360, as shown in FIG. 6A, or the information may be projected from the cover face 340, which is opened like a door, so as to be displayed on the projected surface 360, as shown in FIG. 6B. Alternatively, as shown in FIG. 6C, the information may be projected from an internal space of the projected polyhedron object so as to be displayed on the projected surface 360, or as shown in FIG. 6D, the information may be projected from a predetermined medium 370 provided in the internal space so as to be displayed on the projected surface 360. As another example, as shown in FIG. 6E, the information may be projected from a predetermined face of the projected polyhedron object so as to be displayed on the projected surface 360 in a state in which the cover face 340 of the projected polyhedron object is not opened.

At this time, the projected surface 360 may be newly formed independently of the projected polyhedron object or may be a projected surface separated from the projected polyhedron object. That is, as shown in FIG. 6A, when the cover face 340 is completely separated from the projected polyhedron object, the separated cover face 340 may function as the projected surface 360. At this time, as the cover face 340 is separated from the projected polyhedron object, the separated cover face 340 may become larger, or the transparency or color of the separated cover face 340 may change.

The projected polyhedron object has the following attributes: an identifier and a size of a polyhedron as attributes of a polyhedron; a number, a color, transparency, and information on whether or not a corresponding face is an information face as attributes of a face; and a color of an edge as an attribute of an edge. Further, the projected polyhedron object includes information on which face is a cover face that can be opened and closed, information on whether or not an edge of the cover face is a coupling edge, a method of opening and closing the cover face, a speed of opening and closing the cover face, and information on objects included in the projected polyhedron object. However, attributes are not limited to the above-described attributes, but various attributes according to fields to be applied may be included.

Furthermore, the projected polyhedron object 300 can generate inherent motion within the three-dimensional space. For example, the projected polyhedron object 300 can generate motion, such as location movement, change of a size, or a rotation. In the case of the rotation, the projected polyhedron object 300 can rotate in predetermined angle and direction with respect to one of X, Y, and Z axes.

Figure 7A:
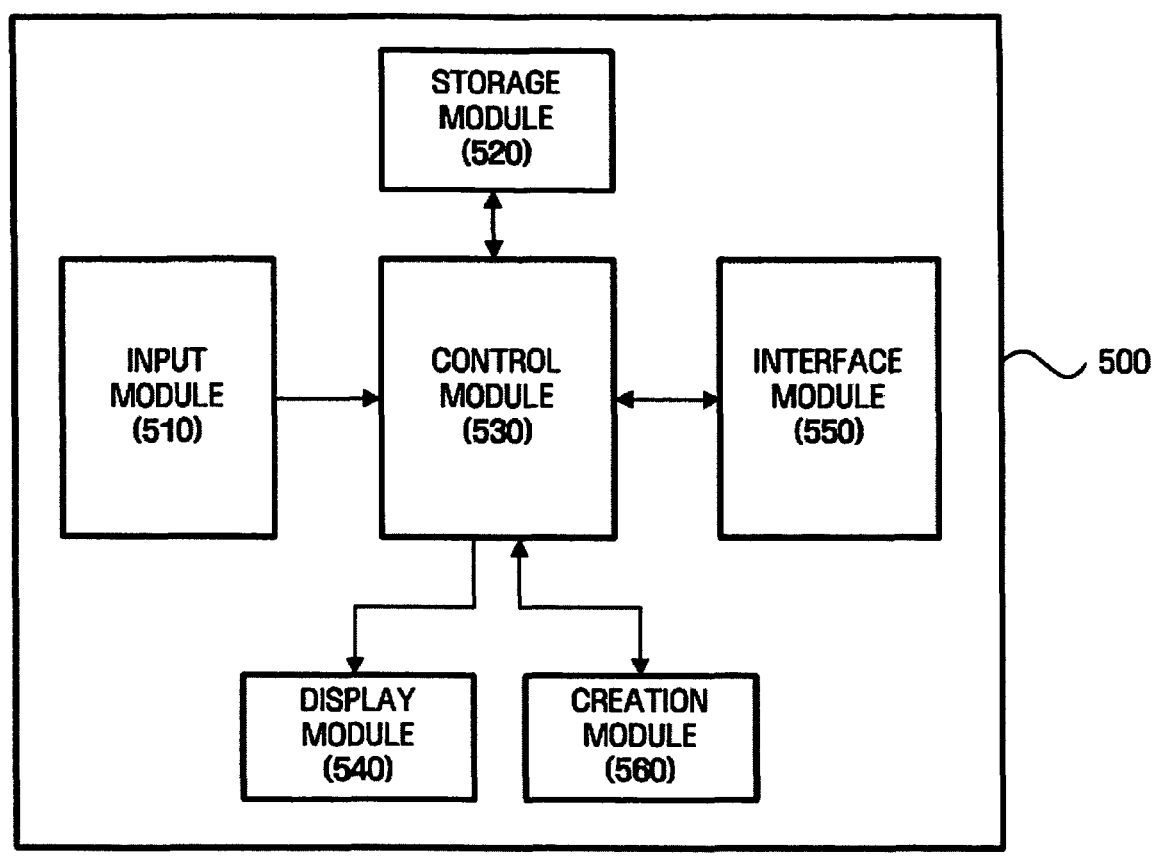
FIG. 7A is a block diagram illustrating an apparatus for providing a three-dimensional motion graphical user interface according to an exemplary embodiment of the present invention.

Next, FIG. 7A is a block diagram illustrating an apparatus 500 providing a three-dimensional MGUI according to an exemplary embodiment of the present invention.

The apparatus 500 providing a three-dimensional MGUI may be a digital device. Here, the digital device includes a device having a digital circuit that processes digital data, examples of which may include a computer, a printer, a scanner, a pager, a digital camera, a facsimile, a digital copying machine, a digital home appliance, a digital telephone, a digital projector, a home server, a digital video recorder, a digital TV broadcast receiver, a digital satellite broadcast receiver, a set-top box, a personal digital assistant (PDA), and a mobile phone.

The apparatus 500 providing a three-dimensional MGUI shown in FIG. 7A includes a creation module 560, an input module 510, a display module 540, a control module 530, a storage module 520, and an interface module 550.

The creation module 560 creates the projected polyhedron objects described with reference to FIGS. 5A and 5B and 6A to 6E.

The storage module 520 stores information on attributes of a projected polyhedron object created by the creation module 560 or attributes of the projected polyhedron objects described above. That is, the storage module 520 stores color and size of a face of a projected polyhedron object, information on whether or not a face is an information face, information on which face is a cover face, information on a coupling edge of a cover face, and information displayed on each face. Further, the storage module 520 stores information on a method of displaying information, which is related to information displayed on each face of the projected polyhedron object, and information from the projected polyhedron object on the projected surface 360. The storage module 520 may be implemented by using at least one of a non-volatile memory device, such as a ROM (read only memory), a PROM (programmable ROM), an EPROM (erasable programmable ROM), an EEPROM (electrically erasable programmable ROM), or a flash memory, a volatile memory device such as a RAM (random access memory), and a storage medium such as an HDD (hard disk drive), but is not limited thereto.

To the input module 510, an input value for selecting a predetermined projected polyhedron object or a predetermined face of the projected polyhedron object is input by a user. The input module 510 may be implemented integrally with the apparatus 500 providing a three-dimensional MGUI in a hardware manner, or the input module 510 may be implemented as a separate module, such as a mouse, a keyboard, a keypad, or a joystick.

The control module 530 connects and manages different modules. For example, the control module 530 controls an operation of the interface module 550 by processing the input value input through the input module 510.

Figure 7B:
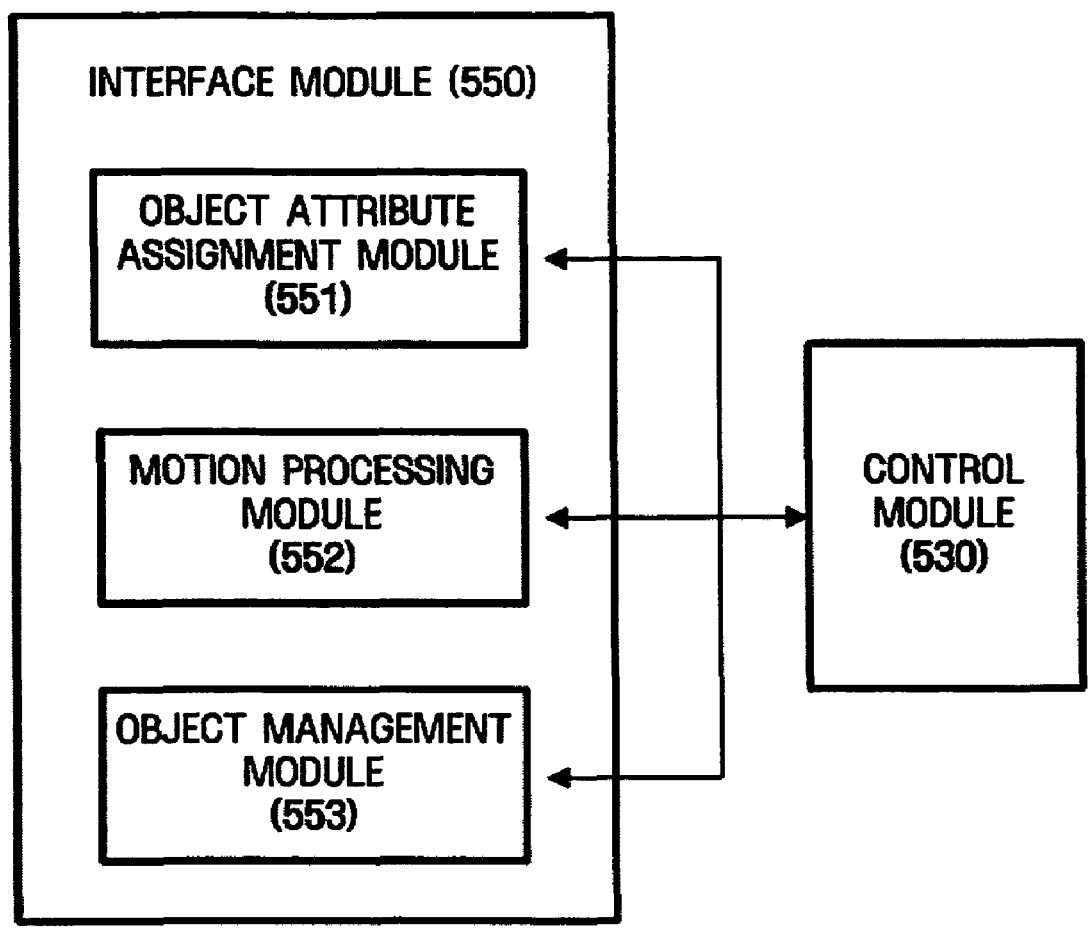
FIG. 7B is a block diagram illustrating a user interface module shown in FIG. 7A.

Further, the interface module 550 provides a three-dimensional MGUI by using a projected polyhedron object created by the creation module 560. The interface module 550 will be now described in detail with reference to FIG. 7B. FIG. 7B is a block diagram illustrating the detailed configuration of the interface module 550.

As shown in FIG. 7B, the interface module 550 includes an object attribute assignment module 551, a motion processing module 552, and an object management module 553.

Figure 8:
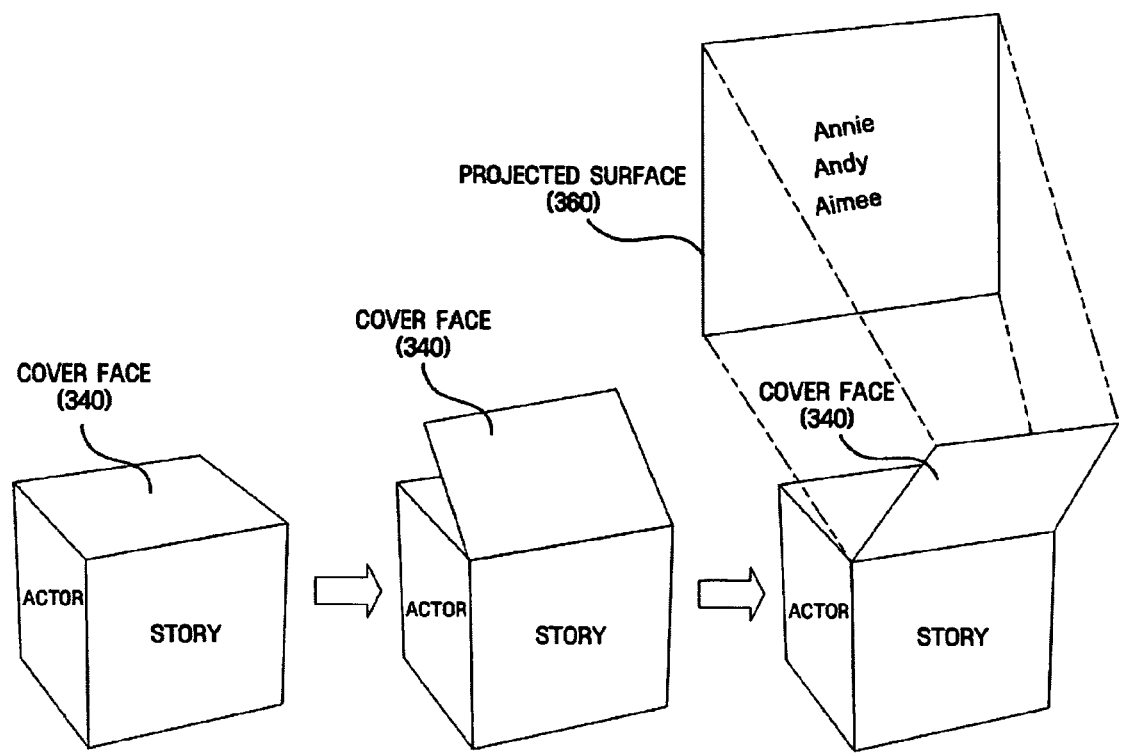
FIG. 8 is a view illustrating that information is mapped onto a projected polyhedron object.

The object attribute assignment module 551 assigns the attributes to the projected polyhedron object created by the creation module 560 and maps information on an information face of the polyhedral object according to the assigned attributes. For example, as shown in FIG. 8, the object attribute assignment module 551 briefly displays information related to a movie on each of the information faces of the projected polyhedron object according to a category.

When a user selects a predetermined projected polyhedron object or a predetermined face of a projected polyhedron object, the object management module 553 performs a process of highlighting the selected face. A method of highlighting the selected part can be realized by creating a predetermined mark on the selected part or changing the attributes of the selected part.

Furthermore, the object management module 553 manages information, which is displayed on faces of a projected polyhedron object, and information related thereto. When a predetermined face is selected by a user, the object management module 553 searches the storage module 520 so as to provide the information, which is related to the information displayed on the selected face, to the motion processing module 552 to be described later. For example, referring to FIGS. 7A and 7B, in the case of a projected polyhedron object, when an "actor" face is selected, the object management module 553 searches the storage module 520 and then provides the detailed information on the "actor" to the motion processing module 552, which will be described below.

The motion processing module 552 processes motion of a projected polyhedron object according to the attribute specified by the object attribute assignment module 551. As an example, the motion processing module 552 opens the cover face 340 of the projected polyhedron object and then forms the projected surface 360 at one side apart from the projected polyhedron object. Then, the motion processing module 552 displays information, which is supplied from the object management module 553, on the projected surface 360 through the cover face 340. For example, in the case when the "actor" face is selected as shown in FIG. 8, the motion processing module 552 displays the detailed information on the "actor" on the projected surface 360, as shown in FIG. 8. If a cover face is not specified in the projected polyhedron object, the motion processing module 552 forms the projected surface 360 around the projected polyhedron object and then displays on the projected surface 360 information corresponding to a predetermined face of the projected polyhedron object.

The display module 540 displays a processing result of the interface module 550. The display module 540 may be implemented separately from the input module 510 in a hardware. Alternatively, the display module 540 may be implemented integrally with the input module 510, examples of which include a touch pad, a touch screen, or the like.

Figure 9:
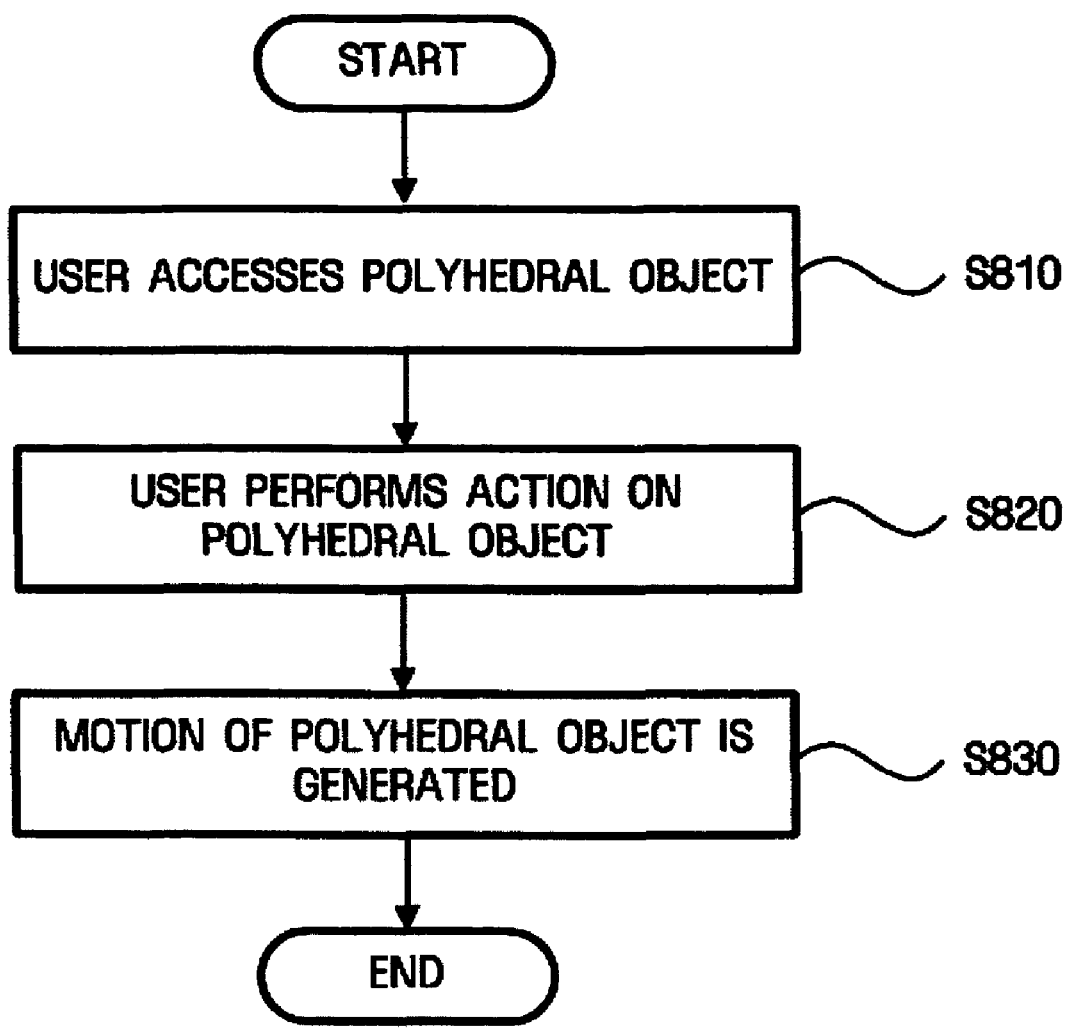
FIG. 9 is a flow chart illustrating a process in which motion of a projected polyhedron object is generated in response to a user's action.

Next, FIG. 9 is a flow chart illustrating a process in which motion of a projected polyhedron object is generated in response to a user's action.

The MGUI object 300 is a three-dimensional dynamic UI object whose motion is generated in response to a user's action. A process of generating the motion is as follows. First, when a user accesses an object (S810) so as to perform a predetermined action on the object (S820), motion is generated in the object in response to the user's action (S830).

In operation S810 in which the user accesses an object, the user accesses a predetermined object that displays interesting information in the MGUI environment. Here, the user can access the object by using various input units, such as a mouse, a keyboard, a keypad, or a touch pad.

Further, in operation S820 in which the user performs a predetermined action on the object, the user may open a cover face of a projected polyhedron object, select a predetermined menu on an information face of the projected polyhedron object, move or rotate the projected polyhedron object or change the size of the projected polyhedron object in order to search for necessary information. A process in which the cover face is opened and then the information on the information face is displayed on the projected surface 360 will be described later with reference to FIG. 9.

Opening the cover face of the projected polyhedron object, selecting the predetermined menu, or moving or rotating the projected polyhedron object can be performed by using various input units, such as a mouse, a keyboard, a keypad, or a touch pad. For example, the predetermined menu can be selected by clicking a selection button (not shown) on the keypad, and the projected polyhedron object can be moved or rotated by using arrow buttons (not shown) on the keypad. In another exemplary embodiment, when a user specifies a projected polyhedron object whose motion is to be generated, a menu about motion that the user can select pops up, and thus the user can perform an action on the object by selecting the pop-up menu.

Data about the user's access or the user's action is input through the input module 510 of the digital apparatus 500, and is then supplied to the interface module 550 through the control module 530.

When the user performs the predetermined action on the projected polyhedron object, the motion of the object is generated in response to the user's action (S830). A process on the motion corresponding to the user's action is performed by the motion processing module 552 of the interface module 550. The motion processing module 552 processes the location of an object according to the motion or data required for the display and then displays a processing result through the display module 540.

Figure 10:
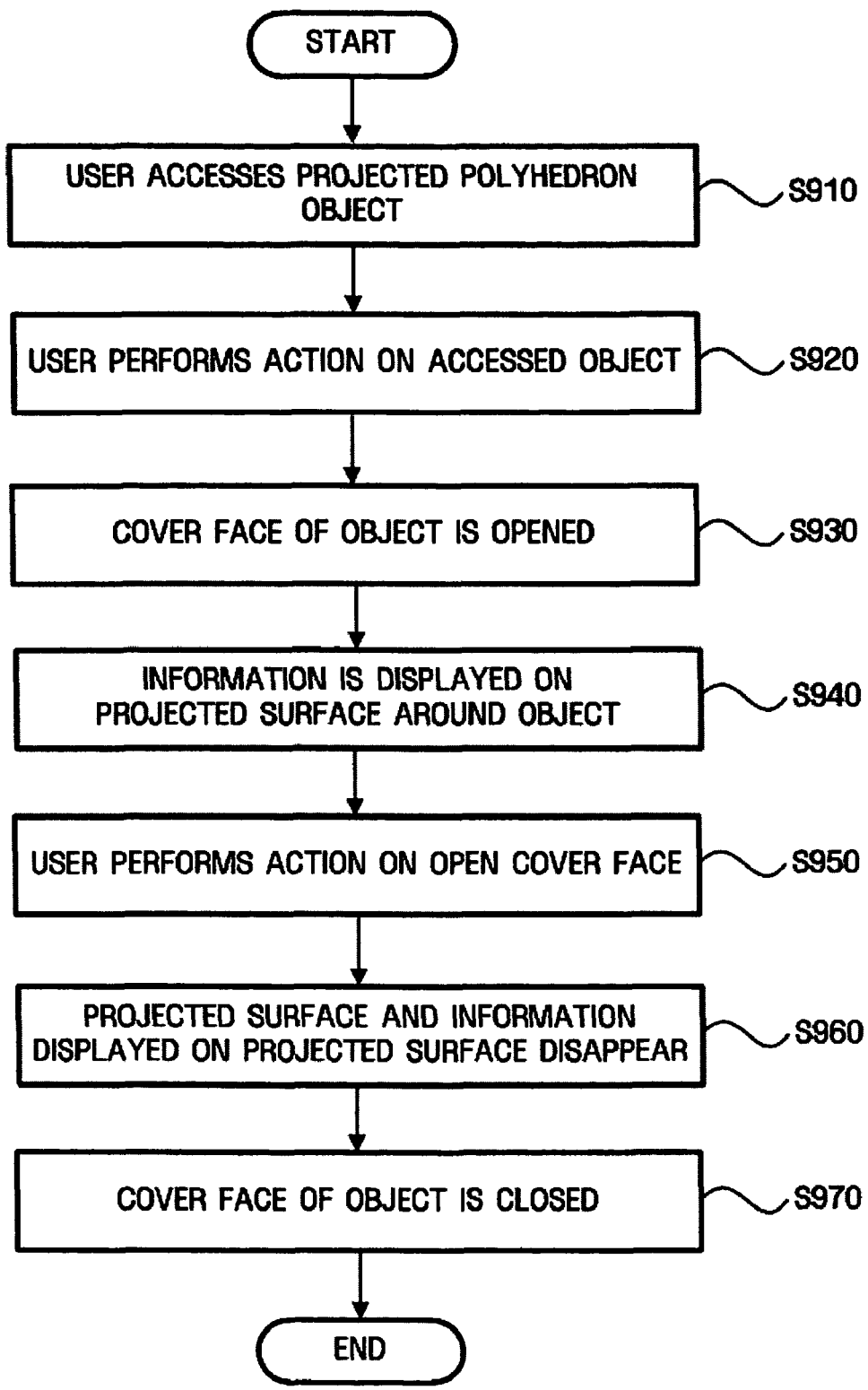
FIG. 10 is a flow chart illustrating a process in which information is displayed in a projected polyhedron object.

FIG. 10 is a flow chart illustrating a process in which one face of a projected polyhedron object is opened by a user's action and then information is displayed on the projected surface 360.

When a user accesses a projected polyhedron object (S910) so as to perform a predetermined action on the object (S920), a cover face of the object is opened in response to the user's action (S930) and then information objects existing in an internal space of the object is displayed on the projected surface 360 formed around the object (S940). After the user searches the information displayed on the projected surface 360, when the user performs an action on the object whose cover face is opened (S950), the projected surface 360 and the information displayed on the projected surface 360 disappear (S960) and then the cover face is closed (S970).

In operation S920, the cover face of the projected polyhedron object can be opened by means of user's commands including: a case in which the user gives a direct command to the cover face (or an information object displayed on the cover face or a controller), a case in which the user gives a command to a different information face (or an information object displayed on the different information face or the controller) related to the cover face, and a case in which the user tries to take a predetermined information object near the projected polyhedron object or insert the predetermined information object into an internal space of the projected polyhedron object. Here, the user's commands mean that, for example, an action in which a selection is made and the selection is confirmed by a user, and an operation starts by the occurrence of the selection. The user's access or the user's action is performed through the input module 510 of the digital apparatus 500, and an input value input to the input module 510 is supplied to the interface module 550 through the control module 530.

When the cover face of the projected polyhedron object is opened by the user's action (S930), information on a face selected by the user or information related to the information on the face selected by the user is displayed on the projected surface 360 formed around the object on the basis of a predetermined method (S940). At this time, if the information is contents, which can be reproduced, such as a moving picture, the information can be reproduced so as to be displayed on the projected surface 360 at the same time as the cover face is opened.

Further, in operation S950, the cover face of the projected polyhedron object can be closed by means of user's commands including: a case in which the user gives a direct command to the cover face or the information object displayed on the cover face or the controller, a case in which the user gives a command to a different information face, which is related to the cover face, or an information object displayed on the different information face or the controller, a case in which the user takes the predetermined information object out of the internal space of the projected polyhedron object that can be opened and closed, and a case in which a predetermined period of time passes after the cover face is opened (in this case, the cover face of the object can be automatically closed).

When data related to the user's action described above is input, the projected surface 360 and the information displayed on the projected surface 360 disappear (S960), and the cover face that has been opened is closed (S970). At this time, operations in which the projected surface 360 and the information displayed on the projected surface 360 disappear and the cover face is closed are sequentially performed by the motion processing module 552 of the interface module 550.

Here, if a cover face of a projected polyhedron object is not specified, the above operations S930 and S970 in which the cover face is opened and closed are omitted.

According to the three-dimensional motion graphical user interface and the apparatus and the method of providing the same, it is possible to achieve one of the following effects.

First, since the projection effects are used, three-dimensional information and two-dimensional information can be displayed such that the three-dimensional information and the two-dimensional information can be dynamically associated to each other.

Second, it is possible to communicate information to a user more intuitively and to please the user.

Although the three-dimensional motion graphical user interface and the apparatus and the method of providing the same according to the exemplary embodiments of the present invention have been described with reference to the accompanying drawings, it will be apparent to those skilled in the art that various modifications and changes may be made thereto without departing from the scope and spirit of the invention. Therefore, it should be understood that the above exemplary embodiments are not limitative, but illustrative in all aspects.

What is claimed is:

1. An apparatus for providing a three-dimensional motion graphical user interface, the apparatus comprising:
   a creation module which creates a polyhedral object in a three-dimensional object space, the polyhedral object including a plurality of walls that enclose an internal space of the polyhedral object, the plurality of walls including a first wall and a second wall that define a boundary of the internal space, the first wall having a first internal face that defines a boundary of the internal space and a first external face, opposite the first internal face, on which first information to be communicated to a user is displayed and the second wall having a second internal face that defines a boundary of the internal space and a second external face, opposite the second internal face;
   a display module which displays the created polyhedral object;
   a memory that stores attributes of the created polyhedral object; and
   an interface module which displays second information, which corresponds to the second external face of the displayed polyhedral object selected by the user, on a projected surface formed separately from the displayed polyhedral object,
   wherein the second information corresponding to the second external face is projected from at least one of an internal face and an external face, of at least one wall among the plurality of walls of the polyhedral object, which is not selected by the user, so as to be displayed on the projected surface.

2. The apparatus of claim 1, wherein the second information displayed on the projected surface includes at least one of information displayed on the second external face and detailed information on the information displayed on the second external face.

3. The apparatus of claim 2, wherein the second information displayed on the projected surface is at least one of a text, an image, a moving picture, and an icon.

4. The apparatus of claim 1, wherein the first wall on which the first information is displayed is a cover wall that is operable to be opened to expose the internal space and closed to enclose the internal space.

5. The apparatus of claim 4, wherein the second information corresponding to the second external face is projected from the internal face of the cover wall so as to be displayed on the projected surface after the cover wall is opened to expose the internal space.

6. The apparatus of claim 4, wherein the second information corresponding to the second external face is projected through the internal space so as to be displayed on the projected surface after the cover wall is opened.

7. The apparatus of claim 1, wherein the projected surface is a face of a wall among the plurality of walls separated from the polyhedral object.

8. A method of providing a three-dimensional motion graphical user interface, the method comprising:

creating a polyhedral object in a three-dimensional object space, the polyhedral object including a plurality of walls that enclose an internal space of the polyhedral object, the plurality of walls including a first wall and a second wall that define a boundary of the internal space, the first wall having a first internal face that defines a boundary of the internal space and a first external face, opposite the first internal face, on which first information to be communicated to a user is displayed and the second wall having a second internal face that defines a boundary of the internal space and a second external face, opposite the second internal face;

displaying the created polyhedral object; and displaying second information, which corresponds to the second external face of the displayed polyhedral object selected by the user, on a projected surface formed separately from the displayed polyhedral object, wherein the second information corresponding to the second external face is projected from at least one of an internal face and an external face, of at least one wall among the plurality of walls, of the polyhedral object which is not selected by the user, so as to be displayed on the projected surface.

9. The method of claim 8, wherein second information displayed on the projected surface includes at least one of information displayed on the second external face and detailed information on the information displayed on the second external face.

10. The method of claim 8, wherein the second information displayed on the projected surface is at least one of a text, an image, a moving picture, and an icon.

11. The method of claim 8, wherein the first wall on which the first information is displayed is a cover wall that is operable to be opened to expose the internal space and closed to enclose the internal space.

12. The method of claim 11, wherein the second information corresponding to the second external face is projected from the internal face of the cover wall so as to be displayed on the projected surface after the cover wall is opened to expose the internal space.

13. The method of claim 11, wherein the second information corresponding to the second external face is projected through the internal space so as to be displayed on the projected surface after the cover wall is opened.

14. The method of claim 8, wherein the projected surface is a face of a wall among the plurality of walls separated from the polyhedral object.

15. A computer-readable recording medium having embodied thereon computer-executable codes, which when executed by a computer, cause the computer to generate a three-dimensional motion graphical user interface comprising:

a polyhedral object including a plurality of walls that enclose an internal space of the polyhedral object, the plurality of walls including a first wall and a second wall that define a boundary of the internal space, the first wall having a first internal face that defines a boundary of the internal space and a first external face, opposite the first internal face, on which first information to be communicated to a user is displayed and the second wall having a second internal face that defines a boundary of the internal space and a second external face, opposite the second internal face, the polyhedral object displayed in a three-dimensional object space; and a projected surface formed separately from the displayed polyhedral object so as to display second information corresponding to a-the second external face of the displayed polyhedral object selected by the user, wherein the second information corresponding to the second external face is projected from at least one of an internal face and an external face, of at least one wall among the plurality of walls of the polyhedral object, which is not selected by the user, so as to be displayed on the projected surface.

16. The computer-readable recording medium of claim 15, wherein the second information displayed on the projected surface is at least one of information displayed on the second external face and detailed information on the information displayed on the second external face.

17. The computer-readable recording medium of claim 16, wherein the second information displayed on the projected surface is at least one of text, an image, a moving picture, and an icon.

18. The computer-readable recording medium of claim 15, wherein the first wall on which the first information is displayed is a cover wall that is operable to be opened to expose the internal space and closed to enclose the internal space.

19. The computer-readable recording medium of claim 18, wherein the second information corresponding to the second external face is projected from the internal face of the cover wall so as to be displayed on the projected surface after the cover wall is opened to expose the internal space.

20. The computer-readable recording medium of claim 18, wherein the second information corresponding to the second external face is projected through the internal space so as to be displayed on the projected surface after the cover wall is opened.

21. The computer-readable recording medium of claim 15, wherein the projected surface is a face of a wall among the plurality of walls separated from the polyhedral object.

* * * * *